United States Patent
Master et al.

(10) Patent No.: US 6,567,108 B1
(45) Date of Patent: May 20, 2003

(54) COMPUTER IMPLEMENTED METHOD OF IMPLEMENTING, MAINTAINING, AND UPDATING A BRAND ARCHITECTURE SYSTEM

(76) Inventors: Syndi Beth Master, 1995 University Ave. Ste. 510, Berkeley, CA (US) 94704; Timothy J. M. Symons, 4 Greenwood Common, Berkeley, CA (US) 94708

( * ) Notice: Subject to any disclaimer, the term of this patent is extended or adjusted under 35 U.S.C. 154(b) by 0 days.

(21) Appl. No.: 09/438,739

(22) Filed: Nov. 11, 1999

(51) Int. Cl.⁷ .............................. G06F 3/00; G06F 17/60
(52) U.S. Cl. ................ 345/853; 345/765; 345/825; 345/826; 345/962; 705/10; 706/47
(58) Field of Search ................ 345/331, 339, 345/353, 356, 357, 440, 962, 971, 764, 765, 810, 818, 825, 826, 835, 841, 853, 854; 705/7, 10; 706/46–48, 60, 925

(56) References Cited

U.S. PATENT DOCUMENTS 5,701,400 A * 12/1997 Amado .................. 706/47 X
5,995,951 A * 11/1999 Ferguson .................... 706/10
6,029,139 A * 2/2000 Cunningham et al. ........ 705/10
6,078,922 A * 6/2000 Johnson et al. .......... 705/10 X
6,119,101 A * 9/2000 Peckover .................. 705/10 X

* cited by examiner

Primary Examiner—Raymond J. Bayerl
Assistant Examiner—X. L. Bautista
(74) Attorney, Agent, or Firm—Blakely, Sokoloff, Taylor & Zafman, LLP

(57) ABSTRACT

A method of implementing an automated brand architecture system is described. The method comprises the computer implemented steps of displaying a navigable brand-architecture chart. The method further comprises receiving a nomination for a new name including a location in the brand-architecture chart. The method further includes testing the name against rules, to see whether the new name fits criteria. If the new name fits criteria, the brand architecture chart is updated with the new name.

35 Claims, 10 Drawing Sheets

|       |                    |                                                      |
| ----- | ------------------ | ---------------------------------------------------- |
| 510   | Name               |                                                      |
|       | Title              |                                                      |
|       | Group              |                                                      |
|       | Contact Information |                                                     |
|       |                    |                                                      |
| 520 → | First Level        | Brand/Product or Ingredient?                         |
| 530 → | Second Level       | Within what Brand/Product/or Ingredient list?        |
| 540 → | Definition of Product |                                                   |
| 550 → | Proposed Product Name |                                                   |
|       |                    |                                                      |
| 560 → | Proposed Support level for product |                                      |
| 570 → | Projected income from Product |                                           |
|       |                    |                                                      |
| 580 → | Does user request help with naming? |                                     |

Fig. 5

| Corporate Name | GENERAL MILLS | | | | |
|---|---|---|---|---|---|
| Product Family Brands | Cheerios Cereal | Betty Crocker | | Stir N Bake Instant Cake Mix | Gold Medal Flour Flour |
| | | Super Moist Cake Mix | Hamburger Helper Main Meal Dish | | |
| Products | Cheerios Apple Cinnamon Cheerios Frosted Cheerios Honey Nut Cheerios Multi Grain Cheerios Plus Team Cheerios | Carrot Chocolate Fudge Devils Food German Chocolate Lemon Marble Sour Cream White Strawberry White Yellow <u>Swirl</u> Creamy Swirls Yellow Cake Double Chocolate Swirl Strawberry Swirl | Beef Pasta Cheddar Cheese Melt Cheddar N Bacon Cheesy Shells Chili Macaroni Creamy Stroganoff Fettuccine Alfredo Homestyle Beef Stew Italian Herb Lasagna Meatloaf Pizza Pasta Potato Stroganoff Ravioli Rice Oriental Salisbury Spaghetti Zesty Mexican | Brownie Carrot Cake Cinnamon Coffee Cake Devils Food Yellow Cake | All-Purpose Organic All Purpose Softasilk Unbleached Whole Wheat Wondra <u>Better for</u> Better for Biscuits Better for Bread Unbleached Better for Bread Wheat Blend |
| Special Ingredients | | With Hershey's Fudge | | With Hershey's Mini Kisses | |

FIGURE 6A

Sample Rules for The Brand Architecture Chart of Figure 6A

Product Family Brands
- Multiple products at launch
- Minimum $50 million launch budget in year 1
- Approval: Executive VP of Marketing and CEO Products
- Appropriate for flavors, form factors, or other extensions of Product Family brands
- Descriptive terminology only
- Approval: automatic if descriptive terminology employed
- May only consider proprietary (trademarked) sub-brand name (e.g., Softasilk) if:
  - Minimum $20 million launch budget in year 1
  - Potential to line extend sub-brand, such that it could eventually grow into a Product Family brand
  - Approval: Executive VP of Marketing Special Ingredients
- Must employ the following format: "with [ingredient]"
- Use of ingredient name must be expected to add at least 30% to sales of relevant Product Family brand
- Ingredient must not be greater in prominence than General Mills or Product Family brand, as measured by annual advertising budgets
- Approval: Executive VP of Marketing

Figure 7

COMPUTER IMPLEMENTED METHOD OF IMPLEMENTING, MAINTAINING, AND UPDATING A BRAND ARCHITECTURE SYSTEM

FIELD OF THE INVENTION

The present invention relates to brand architectures, and more specifically, to an automated brand architecture administration system.

BACKGROUND

A brand name is a name or symbol used to identify a seller's goods or services, and to differentiate them from those of competitors. Because a brand name identifies a product's or service's source—protecting against competitors who may attempt to market similar goods or services—companies have an incentive to invest in the quality, consistency, and imagery of their brands.

In the prior art, often there was no unified method to manage brand names within a company. In one prior art system, trademark counsel kept a list of trademarks and trademark filings for the purposes of keeping trademarks up-to-date and renewing them. Product managers in the organization created new products and potential names for them. The product managers then requested a search for trademark availability of the names. Other companies did not do any searching, causing the companies to risk being sued for trademark infringement.

Generally, in the prior art, organizations had no marketing or strategic central determiner for whether a product needed a name or whether the name chosen by the product manager was appropriate. Furthermore, each time an additional product or service was created the trademark counsel and product manager had to individually process the proposed name.

Therefore, it would be advantageous to reduce the complexity of administering a company's brand names.

SUMMARY OF THE INVENTION

A method of automatically managing and maintaining a brand architecture is described. The method comprises displaying a navigable brand-architecture chart. The method further comprises helping users identify the appropriate, approved location of the desired name on the brand architecture chart. The method further includes testing the name against rules, to see whether the name fits the criteria. If the new name fits criteria, for one embodiment the proposed name is automatically sent to an approver, or to a legal department for approval. For another embodiment, the brand architecture chart is automatically updated with the new name.

For one embodiment, if the name does not fit the criteria, an appeal process to higher tier managers may be automatically triggered. For one embodiment a request for additional conforming name candidates is generated and sent to the appropriate party or parties.

DESCRIPTION OF THE DRAWINGS

The present invention is illustrated by way of example, and not by way of limitation, in the figures of the accompanying drawings and in which like reference numerals refer to similar elements and in which:

FIG. 5 is a sample filled-out questionnaire.

FIG. 6A is an example of a possible layout for a brand architecture chart.

FIG. 7 is an example of the rules implemented by the sample brand architecture charts of FIGS. 6A–D.

DETAILED DESCRIPTION

In the present invention, a brand architecture system is described. A brand architecture specifies and organizes the naming relationships among a company's brands, products, services, divisions, subsidiaries, etc. A well-conceived brand architecture will accommodate company and product line growth, and provide guidance for future product and service names. Some brand architectures are comprised of many tiers, with specific naming guidelines for each.

The brand architecture system described includes a navigable brand-architecture chart. A user is permitted to nominate a new name including a desired location on the brand-architecture chart to the system. For one embodiment, the user may be anyone with authority to access the brand architecture chart. For one embodiment, employees at different tiers have different tiers of access, from viewing access only, to name proposal access, to alteration access.

The proposed new name is tested against the naming rules at that location, to see whether the name fits criteria. If the new name fits the criteria, for one embodiment upon the approval of the legal department and/or a designated approving authority, the brand architecture chart is automatically updated with the new name. Alternatively, the brand architecture chart may be updated without the specific approval, based on the fit of the proposed name into the chart. For an alternative embodiment, the new name is added to a list of approved names, and the brand architecture chart is updated by an individual with alteration access.

For one embodiment, if the name does not fit the criteria, alternative allowable naming parameters are suggested. For one embodiment, if the name not fit the criteria, an appeal process to higher tier managers is automatically triggered. For one embodiment, request for additional name candidates is also sent to the appropriate parties.

Figure 1:
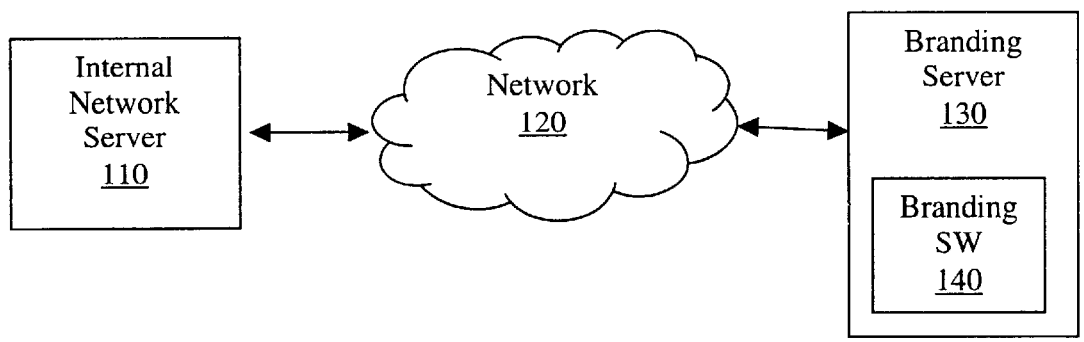
FIG. 1 is a block diagram of one embodiment of a network on which the present invention may be used.

FIG. 1 is a block diagram of one embodiment of a network on which the present invention may be used. An internal network server 110 may be set up on a client's system. The internal network server 110 is accessed by a plurality of clients.

The internal network server 110 accesses a system 130 on which the brand architecture software is implemented through a network 120. For one embodiment, this system 130 may be referred to as the brand architecture system 130, although the server may not be a dedicated server, and the brand architecture software may be on an existing LAN/Intranet. For one embodiment, the internal network server 110 may be the same computer as the brand architecture server 130. For another embodiment, the internal network server 110 may be a separate computer, and the network 120 may be an internal large area network (LAN), wide area network (WAN), the Internet or other network. For yet another embodiment, the brand architecture server 130 may be outside the company, and in fact may be administered by someone outside the company. In that case, the network 120 may be the Internet. For one embodiment, if the network 120 is the Internet, communications between the internal network server 110 and the brand architecture server 130 may be secured by using secure hypertext transmission protocol (https), by encryption, or through some other means of securing the communication. The brand architecture server 130 includes brand architecture software 140, which is described in more detail below.

Figure 2:
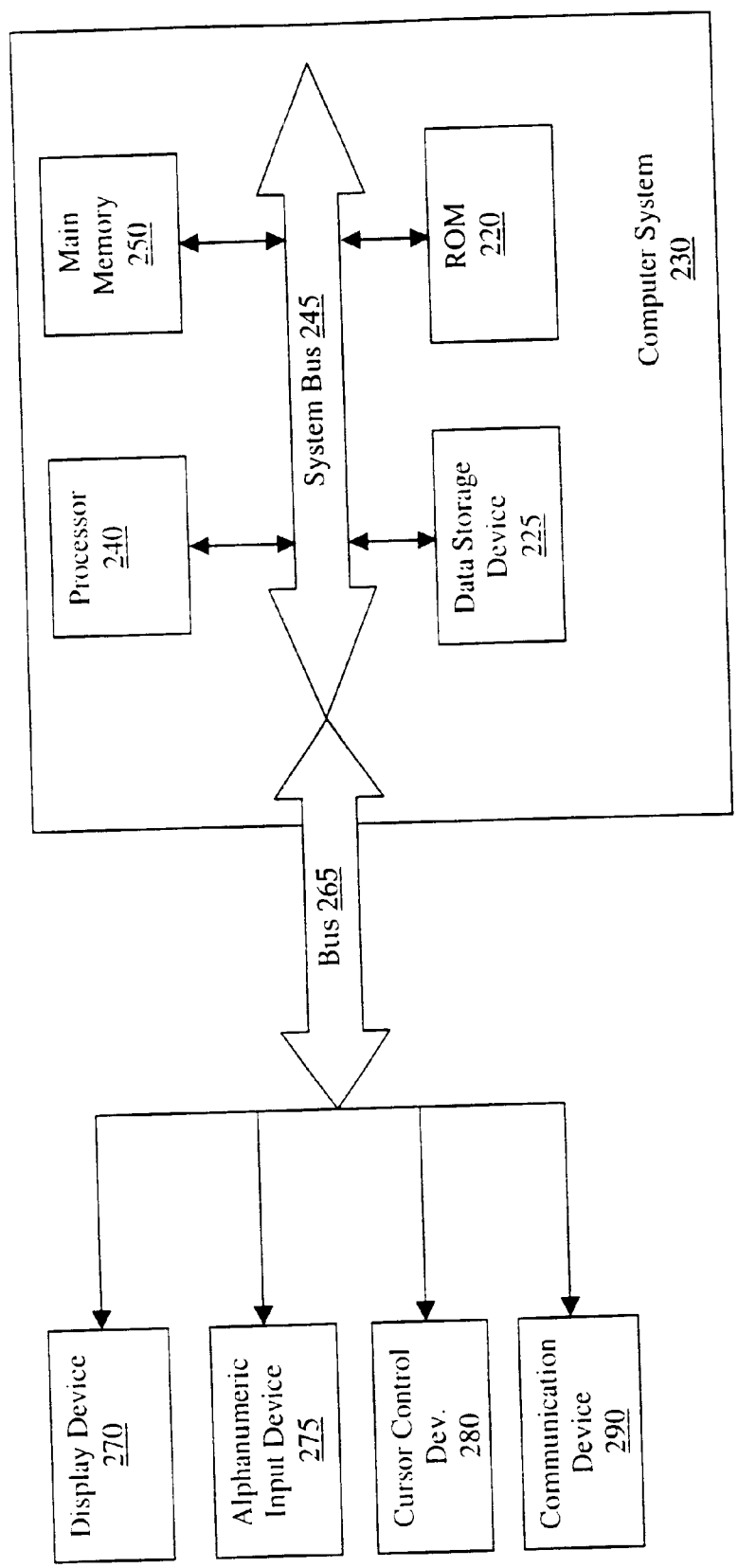
FIG. 2 is one embodiment of computer system on which the present invention may be implemented.

FIG. 2 is one embodiment of computer system on which the present invention may be implemented. FIG. 2 illustrates a typical data processing system upon which one embodiment of the present invention is implemented. It will be apparent to those of ordinary skill in the art, however that other alternative systems of various system architectures may also be used.

The data processing system illustrated in FIG. 2 includes a bus or other internal communication means 245 for communicating information, and a processor 240 coupled to the bus 245 for processing information. The system further comprises a random access memory (RAM) or other volatile storage device 250 (referred to as memory), coupled to bus 245 for storing information and instructions to be executed by processor 240. Main memory 250 also may be used for storing temporary variables or other intermediate information during execution of instructions by processor 240. The system also comprises a read only memory (ROM) and/or static storage device 220 coupled to bus 240 for storing static information and instructions for processor 240, and a data storage device 225 such as a magnetic disk or optical disk and its corresponding disk drive. Data storage device 225 is coupled to bus 245 for storing information and instructions.

The system may further be coupled to a display device 270, such as a cathode ray tube (CRT) or a liquid crystal display (LCD) coupled to bus 245 through bus 265 for displaying information to a computer user. An alphanumeric input device 275, including alphanumeric and other keys, may also be coupled to bus 245 through bus 265 for communicating information and command selections to processor 240. An additional user input device is cursor control device 280, such as a mouse, a trackball, stylus, or cursor direction keys coupled to bus 245 through bus 265 for communicating direction information and command selections to processor 240, and for controlling cursor movement on display device 270.

Another device that may optionally be coupled to computer system 230 is a communication device 290 for accessing other nodes of a distributed system via a network. The communication device 290 may include any of a number of commercially available networking peripheral devices such as those used for coupling to an Ethernet, token ring, Internet, or wide area network. Note that any or all of the components of this system illustrated in FIG. 2 and associated hardware may be used in various embodiments of the present invention.

It will be appreciated by those of ordinary skill in the art that any configuration of the system may be used for various purposes according to the particular implementation. The control logic or software implementing the present invention can be stored in main memory 250, mass storage device 225, or other storage medium locally or remotely accessible to processor 240. Other storage media may include floppy disks, memory cards, flash memory, or CD-ROM drives.

It will be apparent to those of ordinary skill in the art that the methods and processes described herein can be implemented as software stored in main memory 250 or read only memory 220 and executed by processor 240. This control logic or software may also be resident on an article of manufacture comprising a computer readable medium having computer readable program code embodied therein and being readable by the mass storage device 225 and for causing the processor 240 to operate in accordance with the methods and teachings herein.

The software of the present invention may also be embodied in a handheld or portable device containing a subset of the computer hardware components described above. For example, the handheld device may be configured to contain only the bus 245, the processor 240, and memory 250 and/or 225. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

Figure 3:
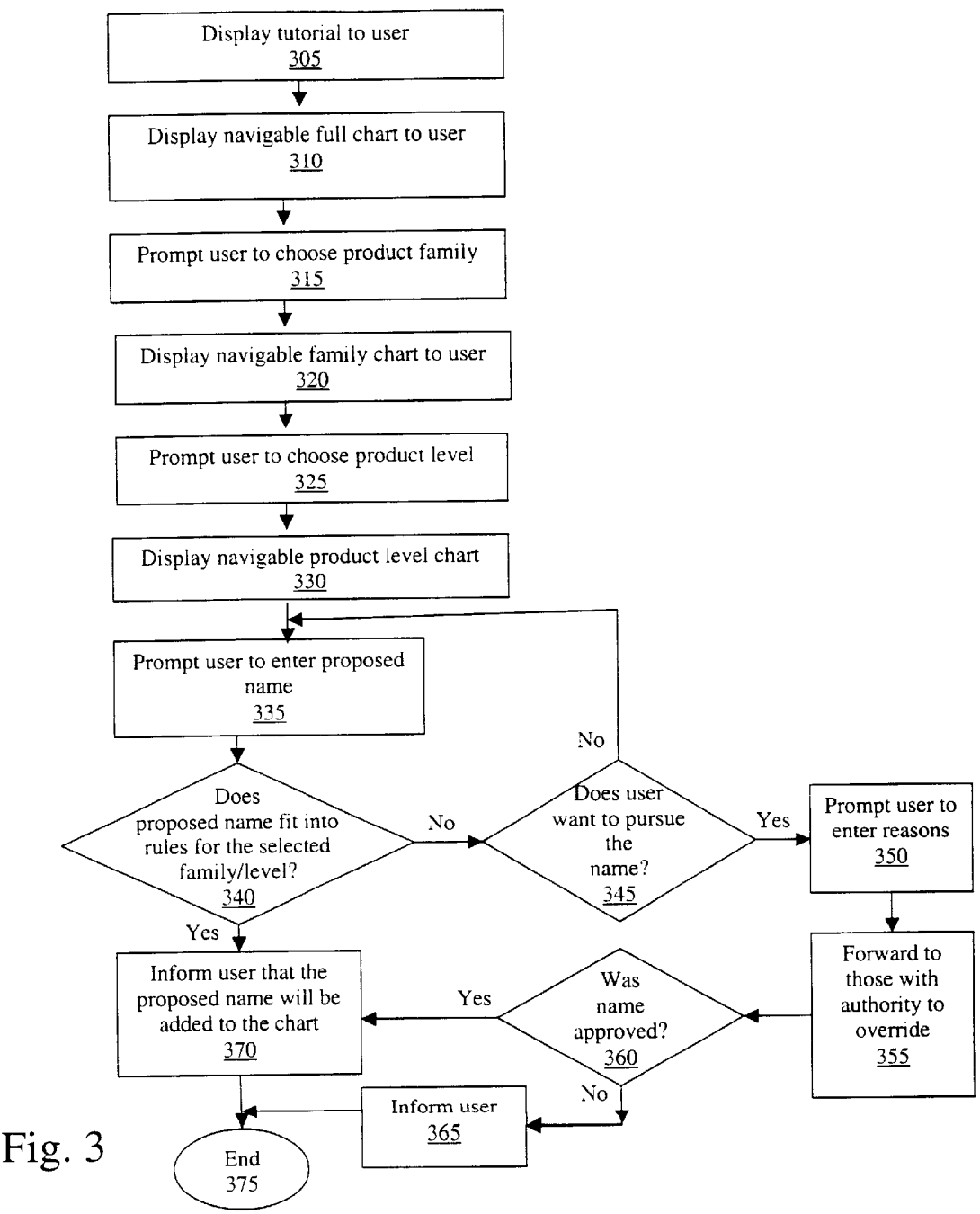
FIG. 3 is a flowchart of one embodiment of the method of editing the brand architecture chart.

FIG. 3 is a flowchart of one embodiment of the method of accessing and querying the brand architecture chart. At block 300, the process starts. The process starts when an authorized user accesses the software, and indicates that he or she wishes to access the brand architecture, to learn about it, to test a name candidate against it, or to add a new item to the architecture.

At block 305, a tutorial is displayed. For one embodiment, the tutorial may be optionally skipped. For one embodiment, this step may be omitted entirely. The tutorial may teach a branding philosophy and/or strategy of the company, the objectives of the branding architecture. The tutorial may include the company's brand architecture policies, methodologies, and rules. For one embodiment, the tutorial may further teach how the branding structure of the company works. For one embodiment, the tutorial may be interactive. Alternatively, the tutorial may be text based, video based, audio based, or in an other format.

At block 310, a navigable brand architecture chart is displayed to the user. Sample charts are shown in FIGS. 6A–D. For one embodiment, this chart may be large enough to cover multiple pages or screens.

Figure 6B:
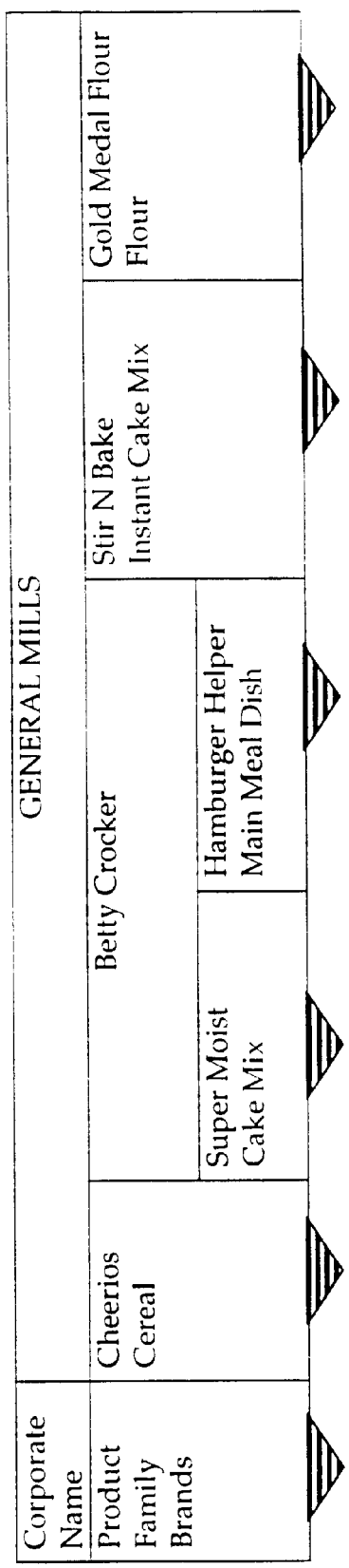
FIG. 6B is an example of a possible layout for displaying a portion of the brand architecture chart of FIG. 6A.
Figure 6C:
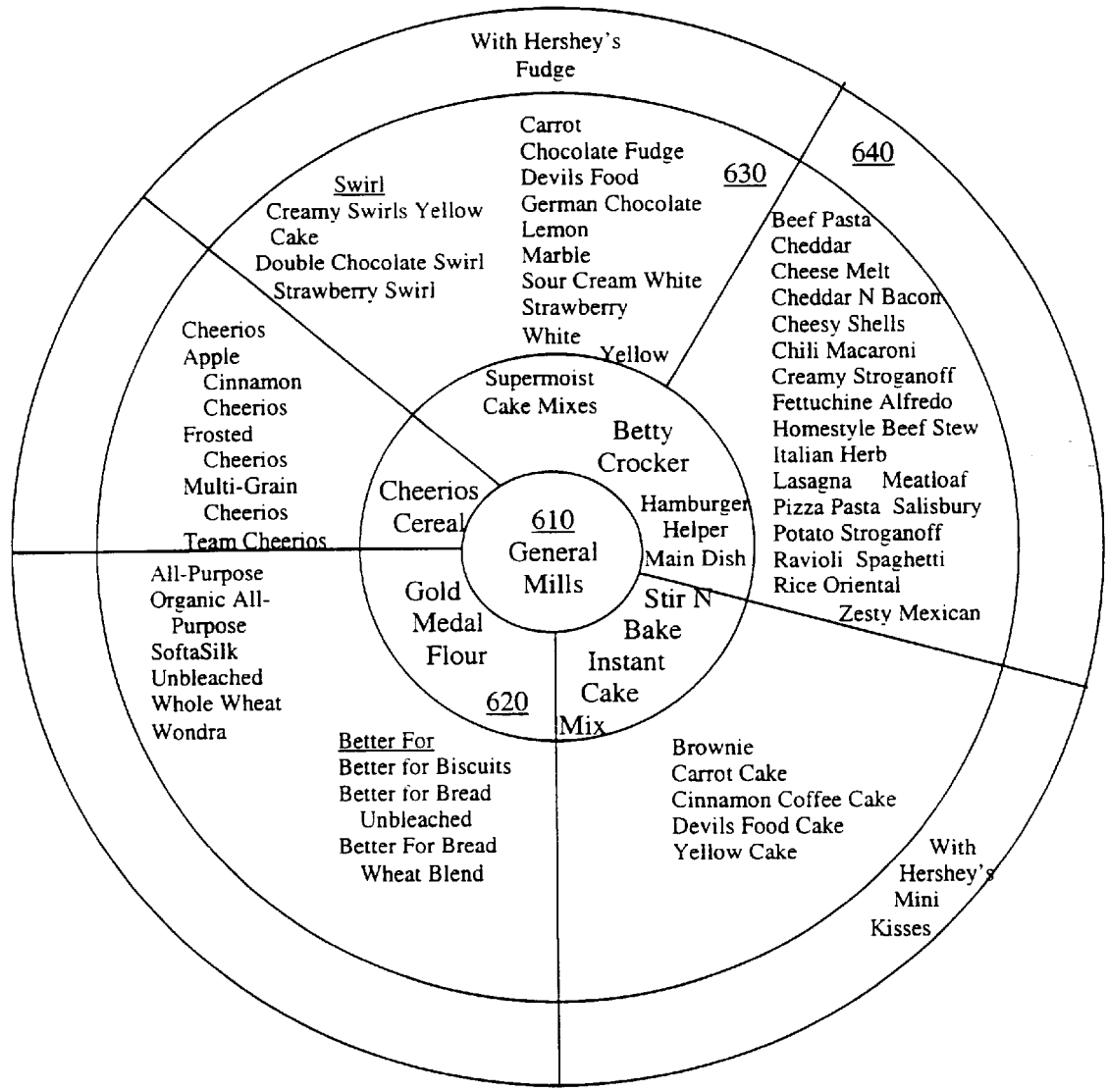
FIG. 6C is another example of a possible layout for a brand architecture chart.
Figure 6D:
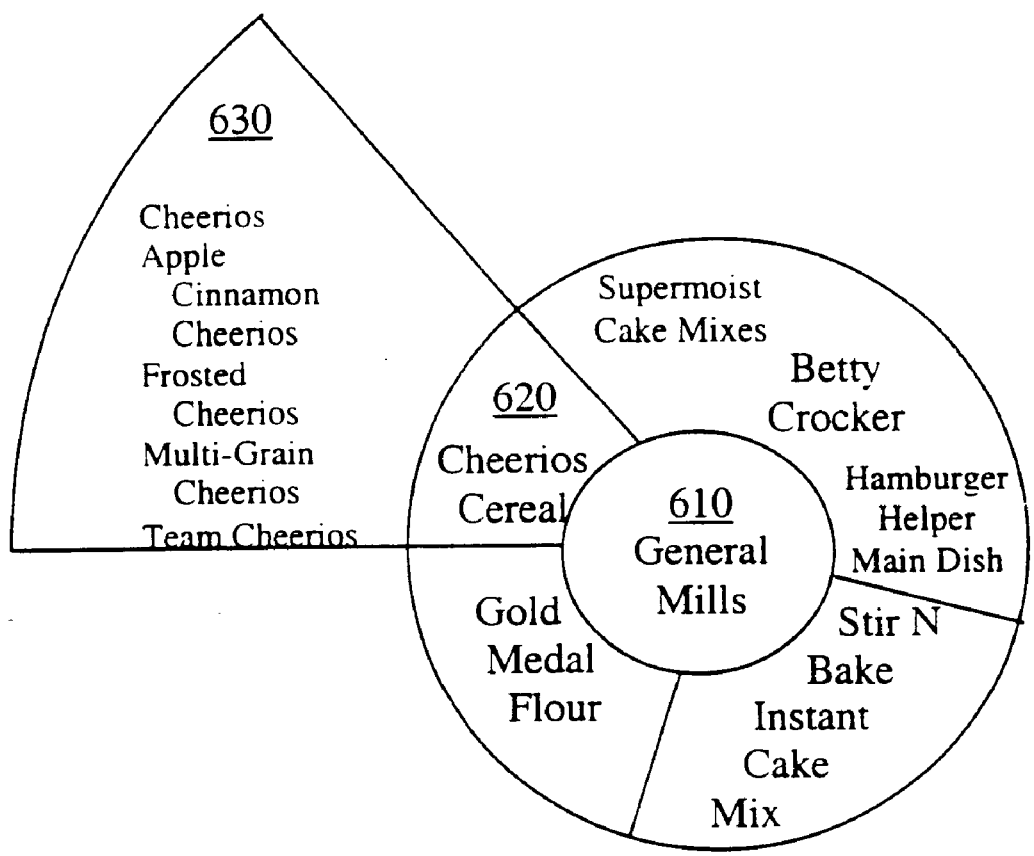
FIG. 6D is an example of a possible layout for displaying a portion of the brand architecture chart of FIG. 6C.

For one embodiment, the chart is displayed hierarchically, i.e. only the product family names are displayed, and the user can select to display the lower tier information for each family. For another embodiment, another method of displaying the chart may be used. FIGS. 6B and 6D illustrate another embodiment of the chart, permitting access to all tiers of the chart, while displaying only the relevant portions of the chart.

For one embodiment, the user may access the brand architecture chart without initiating the editing process. In that instance, the process stops here, and the user can view the navigable brand architecture chart. If the user initiates the editing process, the process continues to block 315.

At block 315, the user is prompted to choose a specific tier of the chart they wish to view. For one embodiment, this is a selection from a pull-down menu or by clicking the tier in the chart. For another embodiment, the user types in the tier name. For yet another embodiment, the user is not directly prompted for this information, but is rather asked to fill in a questionnaire from which this information is deduced. A sample of the questionnaire is included in FIG. 5. For another embodiment, another means of selecting the tier may be used. For one embodiment, this tier may be a "product family" as shown in FIGS. 6A–D. Alternative organizations of brand architecture charts may have alternative tiers, and selections.

At block 320, the navigable chart of the selected tier is displayed to the user. This is a subset of the brand architecture chart displayed at block 310. For embodiment, this is the same chart, with the colors altered, to indicate the selected tier.

At block 325, the user is prompted to choose a product tier. As above, this choice may be made in a variety of ways, including automatically based on the questionnaire.

At block 330, the tier and product tier chosen is displayed to the user.

At block 335, the user is prompted to enter a proposed name.

At block 340, it is determined whether the proposed name fits into the rules of the selected family and tier. As will be discussed in more detail below, the rules restrict the types of names that will be acceptable at each tier. The purpose of the rules is to ensure the implementation of the company's adopted brand architecture, and simplify naming options. These rules are discussed in more detail below, with respect to FIG. 7. If the proposed name fits into the rules, the process continues to block 370. At block 370, the user is informed that the proposed name will be added to the chart.

For one embodiment, the chart is automatically updated at this stage. If, for example, only those with naming authority within the company have access to this process, automating the updating of the chart may be advantageous. The process then ends at block 375. For another embodiment, the approved name is added to a list of proposed names. An authorized person with authority to update the chart then can update the actual chart. For another embodiment, the proposed name may be sent to the legal department or other appropriate person for approval. For example, the company may wish to review a name, even if it fits the rules, to verify that the name is appropriate, that there are no trademark issues, and/or that there are no other criteria that are not embodied in the brand architecture chart.

If the proposed name did not fit into the rules, at block 340, the process continues to block 345. At block 345, it is determined whether the user wishes to proceed with the name in spite of this. For one embodiment, this is determined by prompting the user. For one embodiment, the user should meet certain criteria in order to proceed at this stage. For example, the user may be asked to commit a certain amount of money from his or her budget to search and/or provide marketing support for the proposed name. Other indications of the user's commitment to the name may also be requested. If the user does not wish to go ahead with the name, the process returns to block 335, and the user is again prompted to enter a proposed name. If the user wishes to go ahead with the name, the process continues to block 350.

At block 350, the user is prompted to enter reasons why the non-conforming name should be approved. For one embodiment, this may be done in the form of a questionnaire, or a free-form data entry. For one embodiment, the user provides projections for the product that is being named, including potential sales, etc. For one embodiment, the user's answers to the questions will determine whether the name is likely to be approved although it is outside the approved architecture.

At block 355, the user's entry is forwarded to a designated individual or group who have authority to override the rules embodied in the brand architecture. For one embodiment, this step automatically generates an e-mail sent to the authorized person or persons, including the user's name suggestion, why it does not conform to the branding architecture, whether override criteria have been met, and any other relevant information. Designated persons are authorized to approve the override. For one embodiment, this step automatically connects to a organization chart of the company, and determines correct person or persons to receive this e-mail. For one embodiment, the correct person may be a branding executive, a marketing executive and/or the intellectual property legal department.

For one embodiment, the user is disconnected from this process at this stage. For one embodiment, the user is informed that the request is being forwarded to the person or persons authorized to approve the override request. For one embodiment, the time for approval may be days or weeks.

At block 360, it is determined whether the name has been approved. For one embodiment, the authorized person may return an affirmative or negative statement directly to the brand architecture software. The brand architecture software then analyzes the response, and determines whether it was positive or negative. For one embodiment, if multiple people have authorization to override, either a subgroup of or all of the group must return an affirmative answer in order to end with an approval.

For another embodiment, if the system does not receive a response, either affirmative or negative, within a preset period, the system sends a reminder request to the authorized persons.

If an affirmative response is received, the process continues to block 370, and the user is informed that the requested name has been approved and the proposed name will be added to the chart, and the chart is updated.

If a negative response is received, the process continues to block 365, and the user is informed of the unfavorable response. For one embodiment, the user is also provided a pointer to follow, to reapply for a new name. For one embodiment, the user may follow this pointer, and not have to select the product family and product tier, but rather go directly to block 335, to propose a new name. For one embodiment, the user can request help developing alternative names. A request is then sent to the appropriate name development person or outside agency.

The process terminates at block 375.

Figure 4:
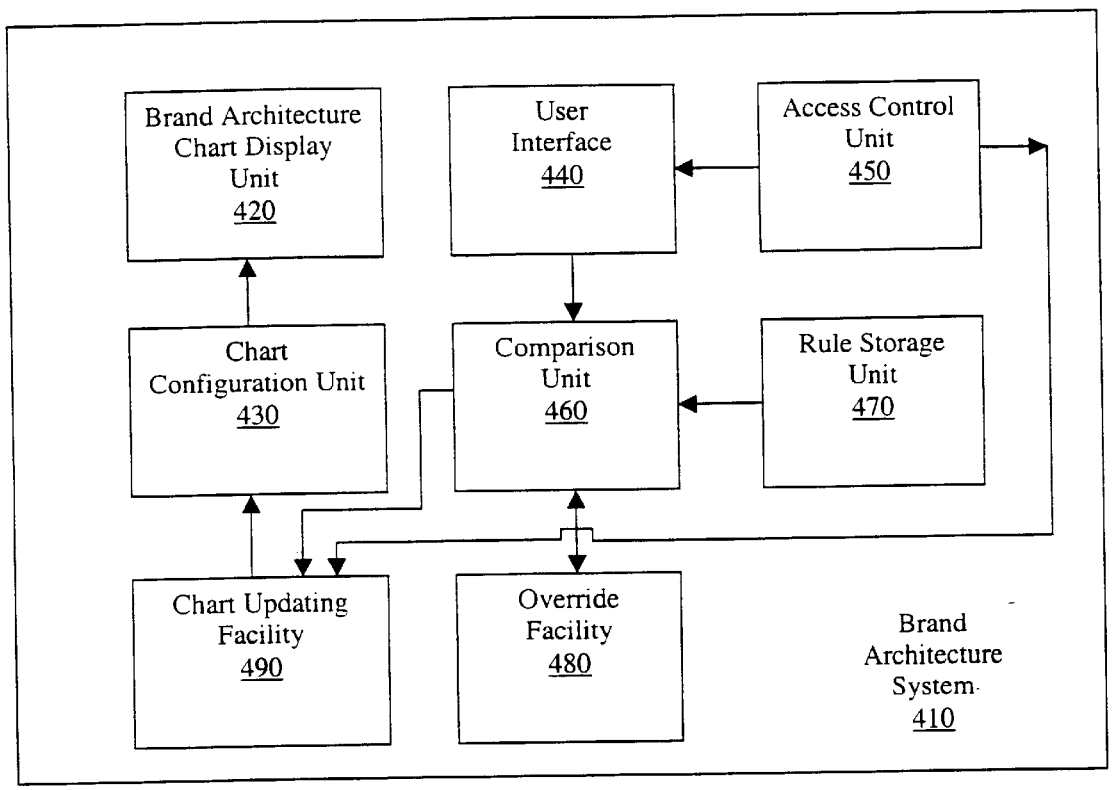
FIG. 4 is a block diagram of one embodiment of the branding software.

FIG. 4 is a block diagram of one embodiment of the brand architecture software. The brand architecture system 410 includes a brand architecture chart display unit 420. The brand architecture chart display unit 420, for one embodiment, is capable of displaying a multi-page brand architecture chart, in various formats. For one embodiment, the format may be a hypertext markup language (HTML) format, a JavaScript implemented format, or another display format. For one embodiment, the chart display unit 420 permits navigation along a family, tier, or arbitrary axis.

The chart configuration unit 430 controls which parts of the chart are displayed by the display unit 420. For one embodiment, as a user navigates through the chart, a narrower and narrower slice of the chart may be visible. The chart configuration unit 430 controls this, based on data from the user interface. If, for example, as described above, the user selects a particular product family, the chart configuration unit 430 instructs the chart display unit 420 to display only the selected product family.

The brand architecture system 410 further includes a user interface 440. The user interface 440 allows a variety of users to access the chart. An access control unit 450 is coupled to the user interface. The access control unit 450 determines the access tier of each user. For one embodiment, the access control unit 450 includes a plurality of classifications for potential users of the system 410. For example, there may be trusted users, those with authority to actually update the system, authorized users, those with authority to propose new names for inclusion in the chart, and other users, those who may look at the system, but may not change it. For another embodiment, the access control unit 450 may use some other method, such as a list of names, to determine access tiers.

For one embodiment, the user interface 440 is configured to the appropriate tier for a user, once that user accesses the system 410. For one embodiment, the user interface 440 displays only those options that are available to the user.

A comparison unit 460 is coupled to the user interface 440. When the user interface 440 receives a proposed name, for a selected product family and product tier, this information is passed to the comparison unit 460. The comparison unit 460 accesses the rules for this particular product family and product tier in the rule storage unit 460. If the name passes the rules, the user is informed of this. For one embodiment, the rules are displayed to the user by the comparison unit 440. If the proposed name meets rules, the name is submitted for approval and entry into the brand architecture chart. If the proposed name is a non-conforming name, the proposed name is forwarded to the override facility 480, if the user so requests.

For one embodiment, the comparison unit 460 automatically determines whether the name as proposed passes certain rules. Certain of the rules may be automatically tested by comparison unit 460. For example, if the rule states that all product names must start with the letter "N," the comparison unit 460 may test whether the proposed name passes this rule. Similarly, for rules such as incorporating certain words, or family brand names, into the proposed name, having a certain number of letters in a name, etc. the comparison unit 460 may automatically determine whether the rule is met by the proposed name.

For one embodiment, for certain rules, the user is merely made aware of the rule and the user has to determine whether the rule is met by the proposed name. For example, for a rule such as "the name must be descriptive" the comparison unit 460 may not test the proposed name, for one embodiment. Rather, the user determines whether the proposed name meets the rule, or whether the override facility should be invoked.

For one embodiment, if the comparison unit 460 determines that the name does not meet the rules, the user is informed of this. For another embodiment, if the comparison unit 460 determines that the name does not meet rules, this is highlighted for the approving authority.

If the name does not pass the rules, the user may ask for assistance for generating alternate names. The a request may automatically be sent to a naming company, or other agency internal to or external to the company, to assist the user in generating an appropriate name. For one embodiment, the comparison unit 460 permits the user to generate this message, and passes the message to the appropriate organizations and/or individuals.

If the name did not pass the rules, but the user confirms that he or she wishes to go ahead with the name, the comparison unit 460 passes the information to the override facility 480.

The override facility 480 automatically forwards the override request to an authorized approver. For one embodiment, the override request is e-mailed to the authorized approver. If the authorized approver is not within the secure network on which the brand architecture system 410 resides, the e-mail or other notification may be encrypted or otherwise secured.

The override facility 480 receives the response(s) from the authorized approver(s). For one embodiment, the override facility 480 sends a reminder or other notification if no response is received within a set period. When the response, or all of the responses, are received, the override facility determines whether the response(s) are positive or negative. For one embodiment, if there are multiple responses, the system can be set to require positive responses from all approvers, or from only a certain number of approvers, or from only a certain approver. The override facility 480 returns the affirmative or negative indication to the comparison unit 460.

The comparison unit 460 forwards this information to the user, and to the chart updating facility 490. If the name was approved, the chart updating facility 490 updates the chart displayed by the display unit 420. For one embodiment, the chart updating facility 490 can automatically update the chart if the nominated name either meets the rules, meets the rules and has been approved, or if the override request is approved. For another embodiment, the chart updating facility 490 maintains approval information. Then, the next time a user with authority to alter the chart logs in, this information is made accessible to the user, and the user can add the approved names.

FIG. 5 is a sample questionnaire. The sample questionnaire is drawn up to correspond to the structure illustrated in FIGS. 6A–D. Of course, as the brand architecture changes for each company, the questionnaire would change correspondingly. It is to be understood that FIG. 5 is exemplary, and should not be interpreted to be a complete or necessary format for such a questionnaire.

A similar type of questionnaire may be displayed to a user attempting to nominate a new name for a new product, service, feature, or technology. The flowchart described in FIG. 3 may be automatically processed—the selection of the appropriate category for the name, the name selection, as well as the method of going outside the rules—based on the information filled into the questionnaire.

The general information 510 that is requested from the user may include the user's name, title, group, and contact information. For one embodiment, the general information 510 may be automatically filled in based on the user's log-in into the system. However, the user is permitted, in one embodiment, to alter the data in the general information category 510.

The first tier selection 520 permits the user to select a brand, product, or category for the new name, in the example chart of FIGS. 6A–D. The user can select whether the new item will be a product family brand, a product, or an ingredient or feature.

The second tier selection 530 permits the user to select a subcategory for the new name. For example, in the brand architecture of FIGS. 6A–D, if the user selected a Product as the first tier selection for the proposed name, the user at this point can select whether the proposed name should be added into the Cheerios Cereal product family, the Super Moist Cake Mix family, etc. After this selection is complete, the system knows what the category and subcategory location is for the new name. Of course, this type of categorization may continue. For example, included in the Cheerios Cereal product family, there may be further sub-categories, such as Children's Cheerios and Adult Cheerios or Low Salt Cheerios and Standard Cheerios. Any such sub-categorizations could be consecutively selected by the user. The user may select either to the lowest tier, i.e. the lowest subcategory available, or the user may suggest the name for a higher tier. For example, in the brand architecture of FIGS. 6A–D, the user may propose a new product family, such as Baking Ingredients.

The product/service definition category selection 540 permits the user to enter a description. This may be optional, unless the user wishes to select a name outside the rules for the selected location.

The proposed name 550 is the new name the user wishes to add to the brand architecture. For one embodiment, the user may review the rules for the proposed location for the name. For one embodiment, the user may be able to view the list of current names within the selected location, in order to simplify the name selection. For another embodiment, the user may see examples of approved names.

For one embodiment, a secondary questionnaire page may be shown to the user if the user's first proposed name has been found to be non-conforming name. For one embodiment, these questions are always shown to the user, but the user is only specifically prompted to fill in the answers if the name is a non-conforming name.

The user's commitment to the product 560 may include a certain amount of money from a budget to research and/or provide marketing support for the name. Other indications of commitment, such as manpower, advertising budget may also be requested. For one embodiment, the commitment tier 560 is automatically requested for product family brands. For one embodiment, this question is only displayed for lower categories if the name was found to be a non-conforming name and the user wishes to submit the name for extra-ordinary authorization.

The projected income from the product 570 is similar to the commitment tier. For one embodiment, the projected income is automatically requested for certain tiers, such as product family brands and special ingredients, but is not requested for lower tiers, unless the proposed name is a non-conforming name.

The request for help naming the product 580 may also be displayed. For one embodiment, the request for help is displayed only when the user's initial name is rejected. For another embodiment, the request for help may also be displayed if the proposed name is a non-conforming name and is likely to be rejected, or if a user is attempting to overcome a rejection. For one embodiment, the request for help 580 sends an e-mail or other communication to an outside agency or to a naming group within the corporation, to assist the user is selecting an appropriate name. For one embodiment, this is a discontinuous process, such that the user is disconnected from the brand architecture system, and is separately contacted with naming help.

FIG. 5 illustrates one example a questionnaire that may be used to guide a user through the naming process. For an alternative embodiment, the user may make all of the above selections through navigating web pages or computer display screens and the brand architecture chart, and using menus. These types of selections among choices and entry of data may be used, and are well known in the art.

FIG. 6A is an example of a brand architecture chart that may be displayed by the present invention. The brand architecture chart of FIG. 6A is only a sample chart, implementing sample rules. It is to be understood that the methods used to generate this chart may be used to generate more or less complex charts, and implement dissimilar rules. The format of the chart may also vary from the format shown in FIG. 6A. FIG. 6A is merely one possible display of one sample chart. FIG. 6C illustrates an alternative display for the brand architecture chart. It is to be understood FIGS. 6A–D illustrate exemplary displays of the brand architecture chart.

This brand architecture chart is an example of a chart that may be viewed, queried, manipulated, and updated by the invention, as described above. The General Mills product line is shown as an example. No affiliation of this patent is meant or implied by using the General Mills product line as an example. All trademarks mentioned in the chart and in the text below are the property of their respective owners.

The first tier 610 is the corporate name 610, which is General Mills.

The second tier 620, are product family names. In this example, product family names 620 include a number of different brands, for example Cheerios cereals, Betty Crocker's Supermoist Cake Mix, Hamburger Helper, Stir N Bake, and Cold Medal Flour. In this example, the product family names 620 may be fanciful names, such as Cheerios, or descriptive names, such as Super Moist Cake Mix. In other examples, a wide variety of other types of names may be allowed.

For a different company, the second tier 620 may not be product family names, but rather, for example, service types, or targeted customers, or another type of category. The selection of the actual categories for the brand architecture chart is not made by the present system, but rather implemented by a person or persons who are familiar with the brand architecture of the actual corporation.

The third tier 630, in this case, is specific products. Thus, in each product family brand 620 there are a number of specific products 630. Thus, for example, the Stir N Bake product family brand 620 includes Brownies, Carrot Cake, and other products. In this example, the products 630 generally have descriptive names. For some product family brands 620, e.g. Cheerios, the product names 630 each include the product family brand name.

Again, in a different corporation, this tier may have a different name, and different rules, and different types of names or name relationships may be allowed.

The fourth tier 640, in this case, is special ingredients or features. Certain products 630 may further include special ingredients 640. For one embodiment, the special ingredients 640 may be items are named on the package, or otherwise highlighted. As can be seen, the special ingredients 640 in this instance are descriptive names of the actual additional ingredient.

As discussed above, these tiers and the items within each tier are entirely dependent on the actual structure of the corporation. For example, in a service corporation, the categories would be different, as would the types of items within each category. Similarly, the rules implemented at each tier may differ substantially depending on the actual corporation. The above list of products and product organizations has been derived independently based on products currently available for a company. It is not to be taken as an actual representation of the products or brand architecture of the company in question. Furthermore, this does not imply any connection between the patentee and the company.

FIG. 6B illustrates a portion of the brand architecture chart of FIG. 6A. FIG. 6B shows a sample display format for displaying a large brand architecture chart that would generally not fit on a single page. The user can select one of the arrows 650, for example, selecting the Super Moist Cake Mix product family brand 620. In that instance, the products listed within this product family brand 620 would be displayed. For one embodiment, the higher categories are not shown, and only the current category, i.e. product family brand, product, or special ingredients is displayed. For another embodiment, once a product family brand 620 is selected, the lower and higher tiers associated with the selected product family brand 620 are displayed. Thus, for example, if the user selects the Cheerios Cereal product family brand 620, the display would include the Corporate name, the Cheerios Cereal product family brand 620, and the products 630 (not shown) that belong in the Cheerios Cereal Product Family brand 620. In this way, the user can easily navigate the brand architecture chart, while only seeing the relevant category at any time.

FIG. 6C illustrates another alternative method of displaying a brand architecture chart. The brand architecture chart is shown as a circular structure, with the corporate name at the center, product family brands in the first ring, products in the second ring, and special ingredients in the third ring. It is to be understood that other brand architecture charts, not having similar components, could similarly be shown in a circular structure.

FIG. 6D illustrates a portion of the brand architecture chart of FIG. 6C. FIG. 6D shows a sample display format for displaying a large brand architecture chart that would generally not fit on a single page. The user can select one of the arrows 650, for example selecting the Cheerios Cereal product family brand 620. In that instance, the products 630 listed within this product family brand 620 would be displayed. For one embodiment, the higher categories are not shown, and only the current category, i.e. product family brand, product, or special ingredients is displayed. For another embodiment, once a product family brand 620 is selected, the lower and higher tiers associated with the selected product family brand 620 are displayed. Thus, for example, if the user selects the Cheerios Cereal product family brand 620, the display would include the Corporate name, the Cheerios Cereal product family brand 620, and the products 630 that belong in the Cheerios Cereal Product Family brand 620. In this way, the user can easily navigate the brand architecture chart, while only seeing the relevant category at any time.

It is to be understood that FIGS. 6A and 6C are exemplary displays of brand architecture charts. Alternative display formats, such as three dimensional triangular, diamond shaped, or having some other shape suited to the particular brand architecture may be used.

FIG. 7 shows a sample set of rules that are implemented in the brand architecture chart of FIGS. 6A–D. The rules may include naming conventions, such as the form of the proposed name, the syllables in the name, the length of the name, the distinctiveness of the name, and any other rules the corporation may wish to implement. The rules may further include information and/or requirements regarding the use of logos, colors, typefaces, and graphics.

The rules may include such rules as the number of products in a product family at launch, the budget, etc. For one embodiment, certain categories, such as product family and proprietary product names may automatically require the approval of someone. In these instances, the flowchart automatically follows the "name rejected" route, described above.

It is to be understood that these rules are only exemplary rules, and different rules may be implemented. Additional rules may be implemented as well, including such rules as requiring a trademark search for a new name, requiring certain persons to support a new name, etc. Other rules may be specific to the corporation—for example, a rule may be that new product names must start with the letter T. Any rules that can be imagined may be implemented in the rules for the brand architecture chart. In this manner, the approval of new names and the adding of new names to the brand architecture chart to form a coherent branding strategy may be automated.

In the foregoing specification, the invention has been described with reference to specific exemplary embodiments thereof. It will, however, be evident that various modifications and changes may be made thereto without departing from the broader spirit and scope of the invention as set forth in the appended claims. Each brand architecture solution will vary more or less from these examples. Similarly, the display formats and the rules that are implemented vary based on the actual structure of the corporation and the brand strategy of the corporation. The focus of the present invention is the automatic requests, updating, and referrals, as described above. The specification and drawings are, accordingly, to be regarded in an illustrative rather than a restrictive sense.

What is claimed is:

1. A computer-implemented brand architecture system comprising:
   a hierarchical brand-architecture chart comprising:
      at least one group displayed at a first tier;
      a plurality of items displayed at a second tier, each of the plurality of items at the second tier categorized under at least one group of the first tier; and
      an updating facility for updating the navigable brand-architecture chart, such that a new entry is entered in a proper group of the plurality of groups, and at a proper tier.

2. The system of claim 1, wherein the plurality of tiers comprise:
   a first tier including a plurality of product families;
   a second tier including a plurality of individual products, wherein each of the individual products are categorized in one of the product families.

3. The system of claim 2, wherein the second tier includes a product group having multiple individual products within the product group.

4. The system of claim 1, further comprising:
   a chart configuration unit for controlling the amount of the chart that is displayed.

5. The system of claim 1, further comprising:
   a comparison unit, for receiving a proposed name, and for comparing the proposed name against a set of rules, and determining is the proposed name fits within the rules.

6. The system of claim 5, further comprising:
   an override facility, the override facility for requesting permission to override the rules, and permit the proposed name that failed the rules.

7. The system of claim 6, wherein requesting permission comprises automatically sending a request to authorized personnel, and determining whether the response was affirmative or negative.

8. The system of claim 1, further comprising:
   an access control unit for limiting access to the brand architecture chart, the access control unit permitting only certain users to alter the chart.

9. The system of claim 8, wherein the access control unit permits certain users to alter the chart, and certain other users to request a new name.

10. A method of implementing an automated brand architecture management system, comprising:
  displaying a hierarchical brand-architecture;
  receiving a nomination for a new name including information indicative of a position in the hierarchy of the brand-architecture;
  comparing the nomination against rules to determine whether the new name fits criteria; and
  if the new name fits criteria submitting the nomination for approval and, automatically updating the brand-architecture with the new name upon receipt of approval.

11. The method of claim 10, wherein if the new name does not fit the criteria,
  determining if there is an exception procedure; and
  if there is an exception procedure, implementing the exception procedure.

12. The method of claim 11, wherein the exception procedure comprises:
  automatically electronically sending the nomination and accompanying information to an authority who can approve the exception to the rules.

13. The method of claim 12, further comprising:
  receiving a response from the authority; and
  if the response is affirmative, automatically updating the brand architecture chart, and informing a nominator of the affirmative response.

14. The method of claim 13, further comprising:
  if the response is negative, informing a nominator of the negative response, and permitting the nominator to nominate a new proposed name for the product.

15. The method of claim 13, further comprising:
  if the response is negative, informing a nominator of the negative response and permitting the nominator to request help generating a proposed name that would result in a positive response.

16. The method of claim 13, wherein the authority is a plurality of persons, and wherein the response comprises a plurality of responses, and an affirmative response comprises affirmative responses from each of the plurality of persons.

17. The method of claim 11, wherein the exception procedure comprises:
  requiring a commitment from the nominating group to support the new name.

18. The method of claim 10, wherein the rules comprise a limitation on a type of name being used.

19. The method of claim 10, wherein the step of receiving a nomination for a new name including a location in the brand-architecture chart, comprises:
  receiving a filled-in questionnaire, indicating a tier and a category, and a proposed name.

20. The method of claim 19, wherein after the user selects a product family and a product tier, the rules for naming within that product family and product tier are displayed to the user, prior to allowing the user to enter the nomination.

21. The method of claim 20, further comprising indicating to the user that the name may be outside of the rules, if certain conditions are met.

22. The method of claim 10, wherein the step of receiving a nomination for a new name comprises:
  prompting a user to select a product family, after reviewing the entire brand chart;
  prompting the user to select a location, after reviewing the entire product family; and
  prompting the user to enter the nomination for a proposed product name.

23. A method of maintaining a brand architecture management system to simplify maintaining coherent branding strategy, the method comprising:
  defining a brand architecture chart including current and proposed names;
  defining a rule set for the brand architecture chart to maintain the coherent branding strategy;
  incorporating the rule set into an automatic nomination system that receives new name nominations from users; and
  prompting a user to compare a new name nomination against the rule set, and accepting the new name nomination if the new name fits within the rule set.

24. The method of claim 23, wherein if the new name nomination does not fit within the rule set, the method further comprises:
  permitting the user to request help in selecting a different name; and
  permitting the user to appeal the decision to an authority that may override the rule set.

25. The method of claim 23, further comprising automatically adding the new name to the brand architecture chart if the new name is accepted.

26. An automated brand architecture management system comprising:
  a rule storage unit for storing pre-determined rules;
  a display mechanism for displaying a hierarchical brand-architecture;
  a user interface for receiving a nomination for a new name from a user, the nomination including information indicative of a position in the hierarchy of the brand-architecture;
  a comparison unit for comparing the nomination against the pre-determined rules from the rule storage unit, to determine whether the new name fits criteria and submitting the nomination for approval if the new name meets the pre-determined rules; and
  a chart updating facility for automatically updating the brand-architecture with the new name upon receipt of approval.

27. The automated brand architecture management system of claim 26, further comprising, if the new name does not fit the criteria:
  an override facility for implementing an exception procedure.

28. The automated brand architecture management system of claim 27, wherein the exception procedure comprises the override facility automatically electronically sends the nomination and accompanying information to an authority who can approve the exception to the rules, if the new name.

29. The automated brand architecture management system of claim 28, further comprising:
  the override facility for receiving a response from the authority; and
  if the response is affirmative,
  a chart updating facility for automatically updating the brand architecture chart, and informing a nominator of the affirmative response.

30. The automated brand architecture management system of claim 29, further comprising:

if the response is negative, the user interface for informing a nominator of the negative response, and permitting the nominator to nominate a new proposed name for the product.

31. The automated brand architecture management system of claim 29, further comprising:

if the response is negative, the user interface for informing a nominator of the negative response; and an access control unit for permitting the nominator to request help generating a proposed name that would result in a positive response.

32. The automated brand architecture management system of claim 28, wherein the authority is a plurality of persons, and wherein the response comprises a plurality of responses, and an affirmative response comprises affirmative responses from each of the plurality of persons.

33. The automated brand architecture management system of claim 26, wherein the exception procedure comprises:

the override facility requiring a commitment from the nominating group to support the new name.

34. The automated brand architecture management system of claim 26, wherein the rules comprise a limitation on a type of name being used.

35. The automated brand architecture management system of claim 34, wherein after the user selects a tier, the user interface displays rules for naming within that tier, prior to allowing the user to enter the nomination.

* * * * *